United States Patent [19]
Valentino

[11] 3,986,597
[45] Oct. 19, 1976

[54] CARTON FEEDING SYSTEM

[75] Inventor: Michael L. Valentino, Venice, Fla.

[73] Assignee: FMC Corporation, San Jose, Calif.

[22] Filed: Aug. 21, 1974

[21] Appl. No.: 499,395

[52] U.S. Cl. ............................... 198/358; 53/59 R
[51] Int. Cl.² ....................................... B65G 43/00
[58] Field of Search ............... 198/20 R, 21, 24, 27, 198/34, 37, 38, 76, 163, 165, 185, 81, 221, 222; 214/6 TS, 11 R, 11 As, 11 C, 1 BB, 1 BD; 53/59 R

[56] References Cited
UNITED STATES PATENTS

| | | | |
|---|---|---|---|
| 2,470,922 | 5/1949 | Dunn | 198/81 |
| 2,805,755 | 9/1957 | Jones | 198/34 |
| 2,942,715 | 6/1960 | Miller | 198/24 |
| 3,044,638 | 7/1962 | Bruce | 214/11 R |
| 3,101,851 | 8/1963 | Heide et al. | 198/21 |
| 3,122,231 | 2/1964 | Pence et al. | 198/38 |
| 3,575,278 | 4/1971 | Hoffmann et al. | 198/34 |

FOREIGN PATENTS OR APPLICATIONS 2,149,178  4/1972  Germany ............... 198/163

Primary Examiner—Evon C. Blunk
Assistant Examiner—Joseph E. Valenza
Attorney, Agent, or Firm—R. S. Kelly; J. W. Edwards; C. E. Tripp

[57] ABSTRACT

Empty cartons are automatically fed by a conveying system to a plurality of packing machines in accordance with the carton demand of each machine. The packing machines operate to fill the cartons with a product such as bulk fruit for example. An accumulation conveyor receives open-topped empty cartons which have been formed either by hand or by a carton set-up machine. The cartons can accumulate upon the conveyor in a single file series and are fed in order to a singulator. The singulator discharges an empty carton only upon demand by one of the packing machines. Such a carton is carried by a feed conveyor along a path to a plurality of feed units one of which will be programmed to stop the movement of the carton along the feed conveyor path and shift it laterally toward the appropriate packing machine. Control means sense the need for cartons at each packing machine and direct the singulator and feed units to feed a single empty carton to the packing machine which requires it. The entire carton feeding system can be located on one floor level, or, in a modified form of the invention, the singulator can operate to lower cartons from an upper floor level to a lower floor level before discharging the cartons for delivery to the packing machines.

9 Claims, 16 Drawing Figures

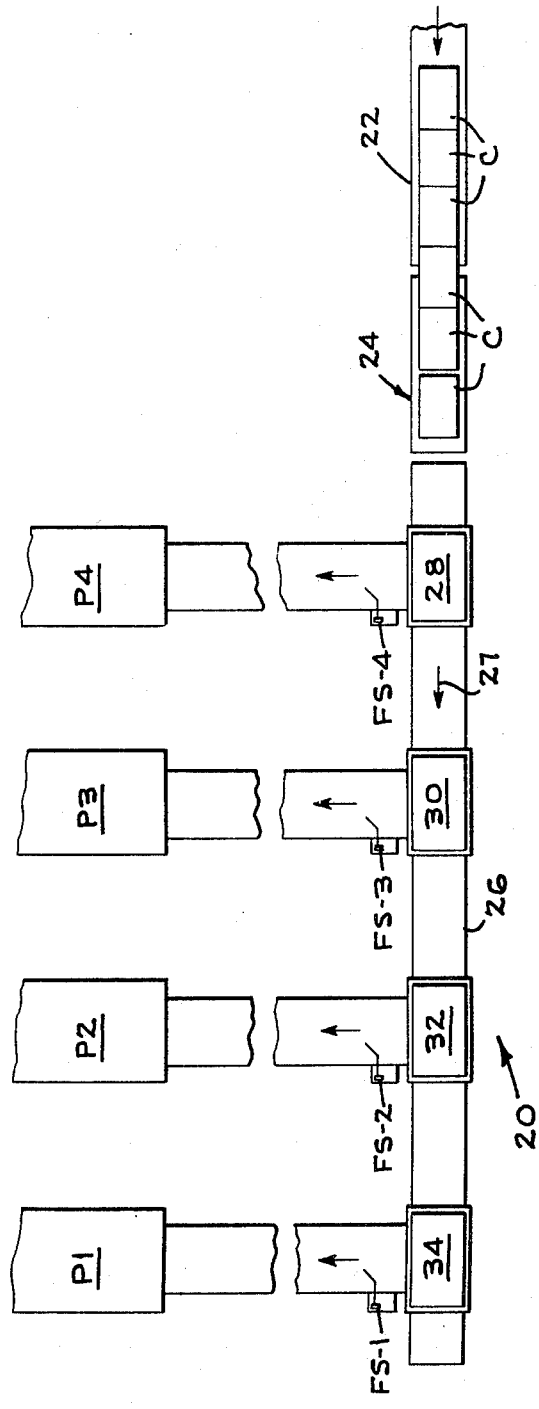
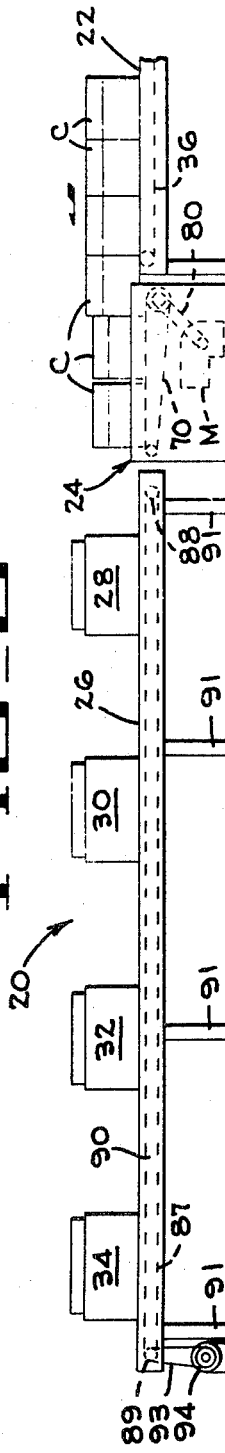

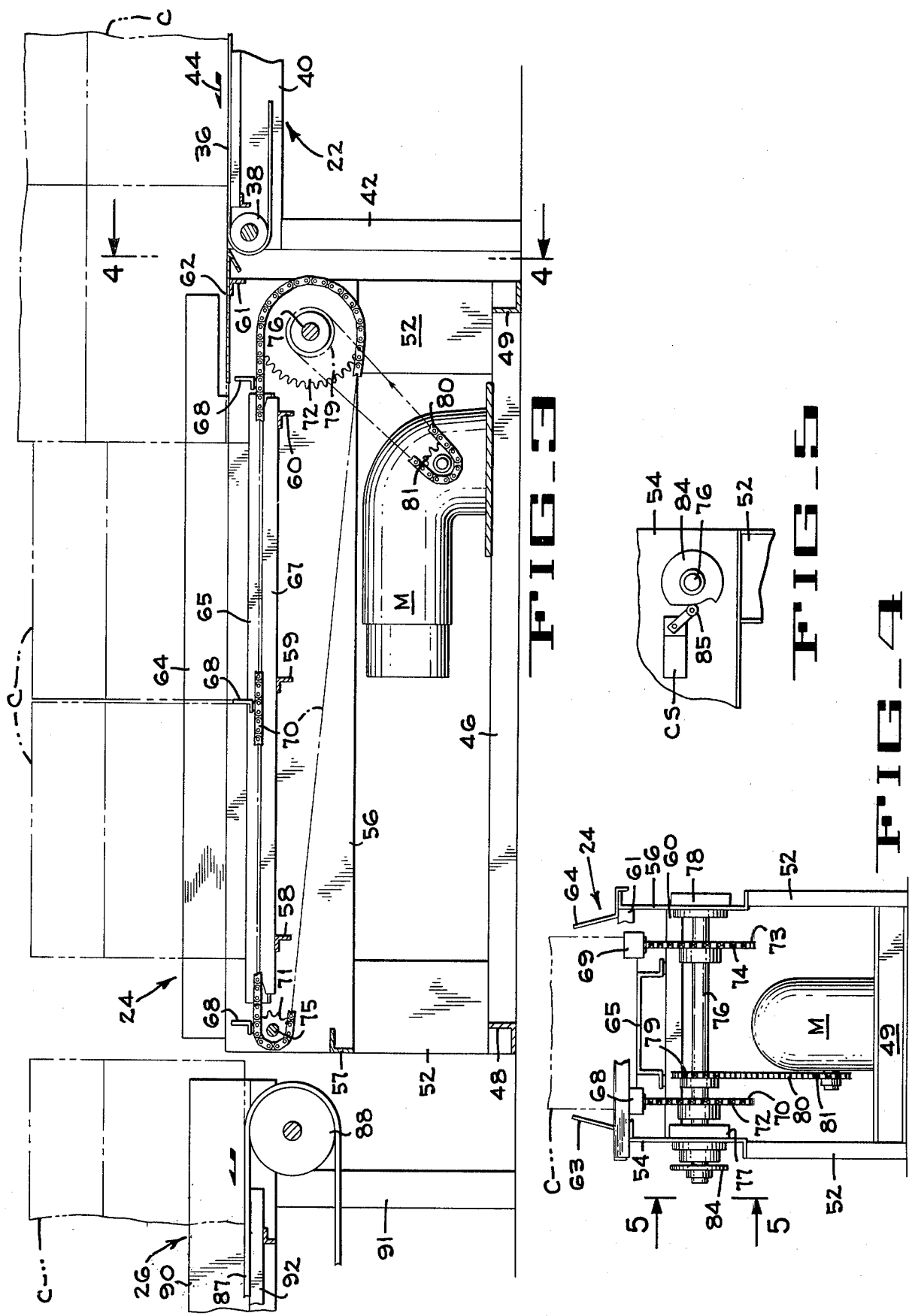

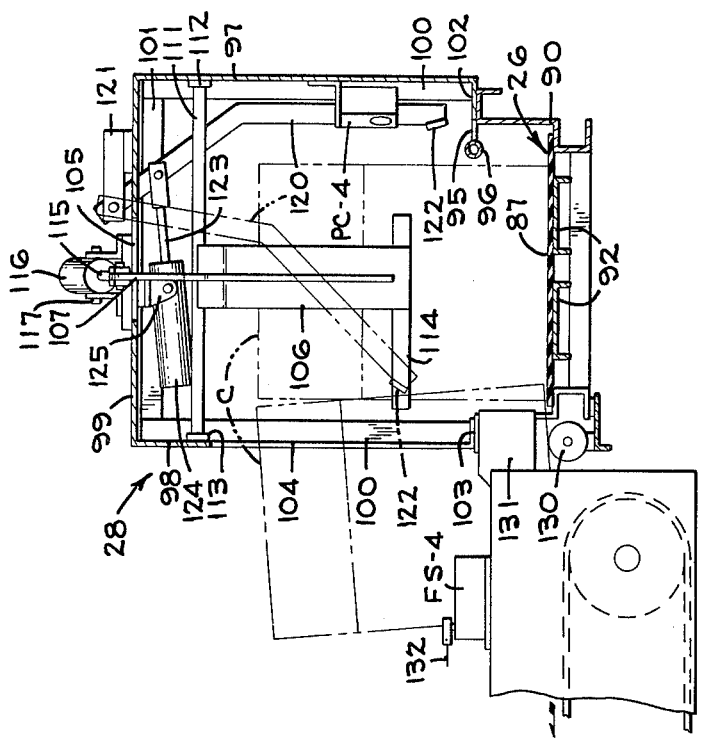
FIG_8
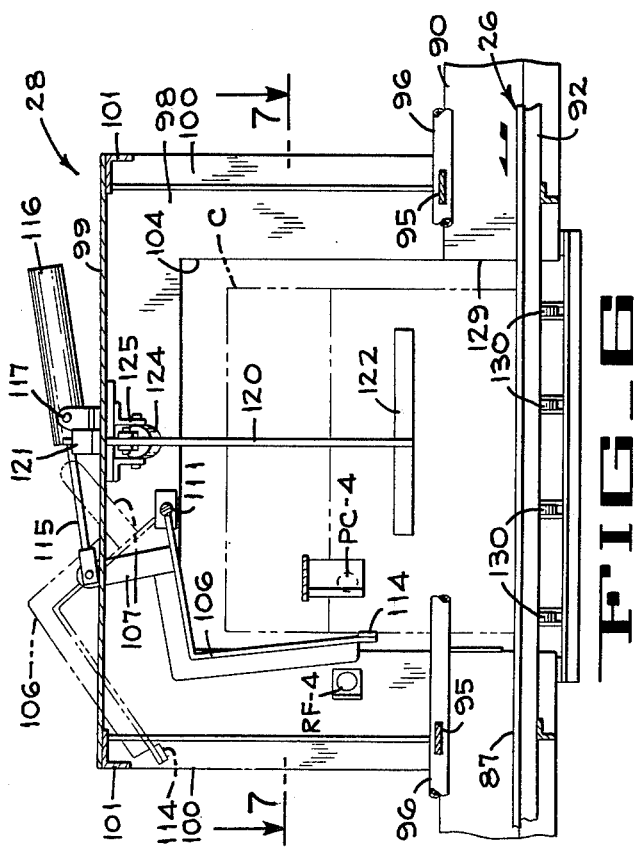
FIG_6
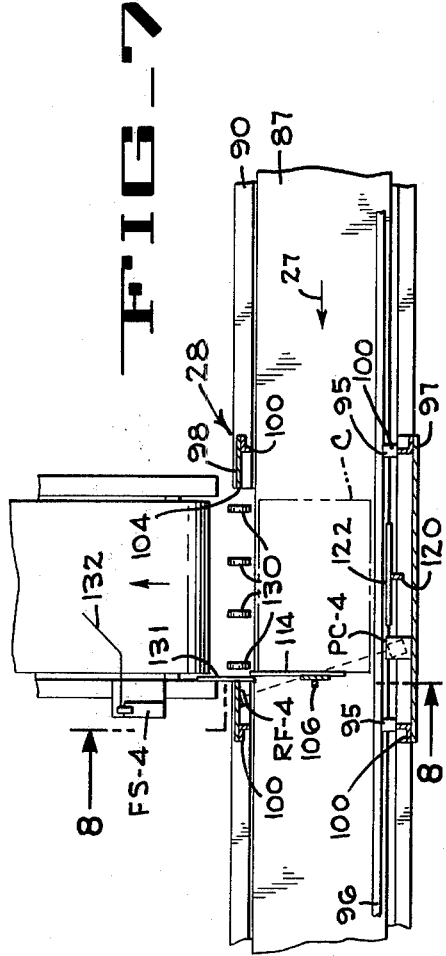
FIG_7

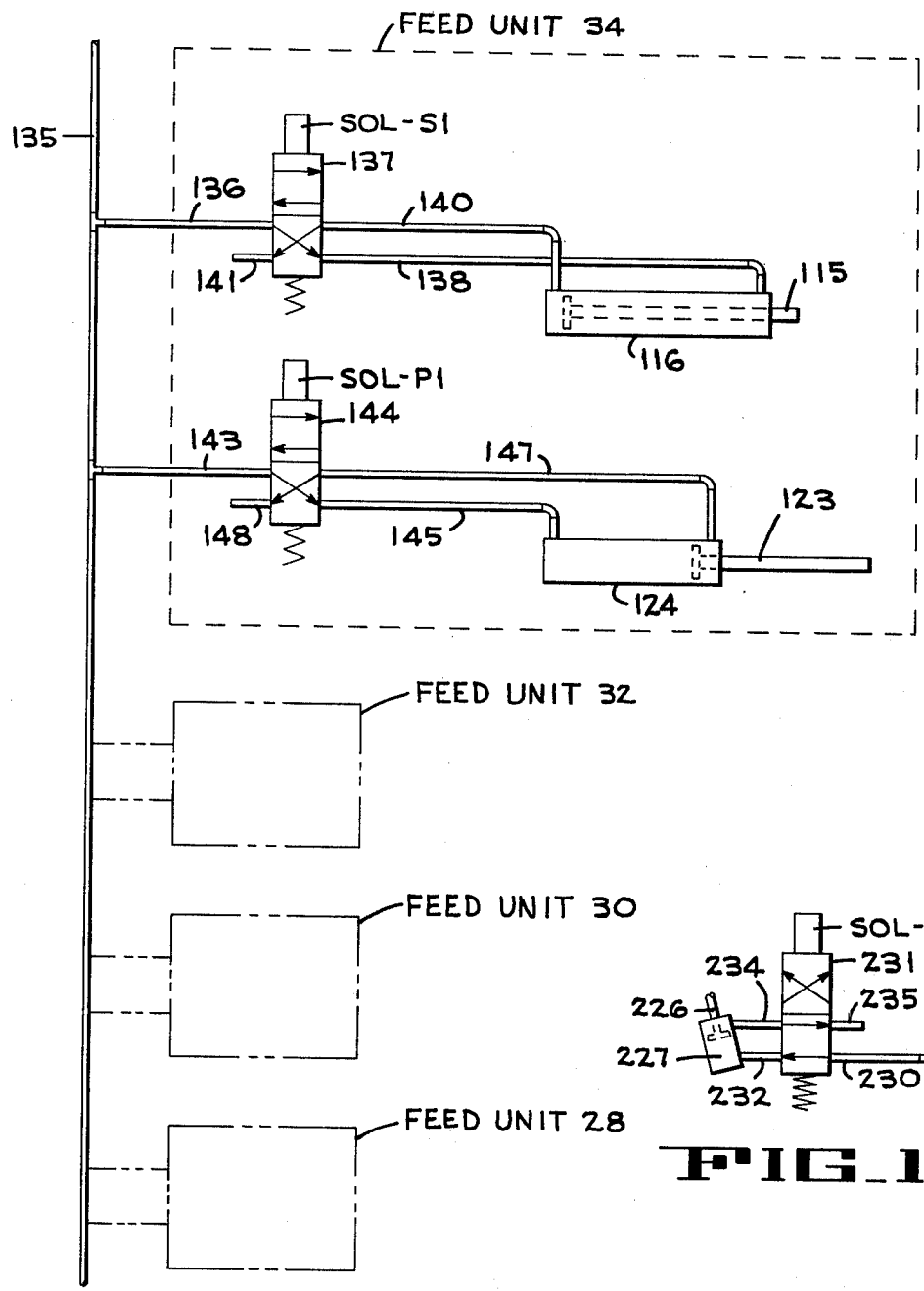
FIG_9
FIG_15
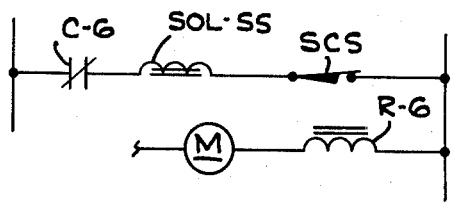
FIG_16

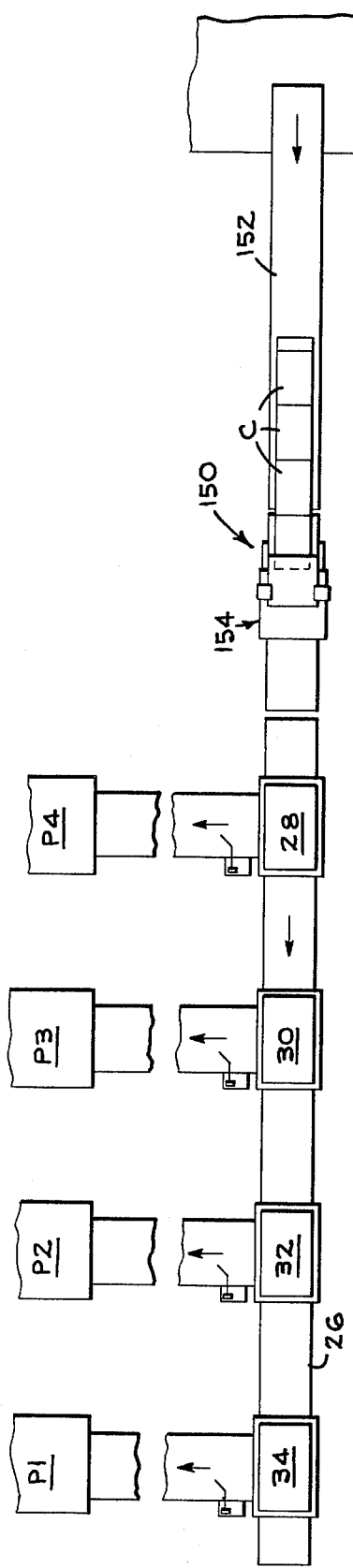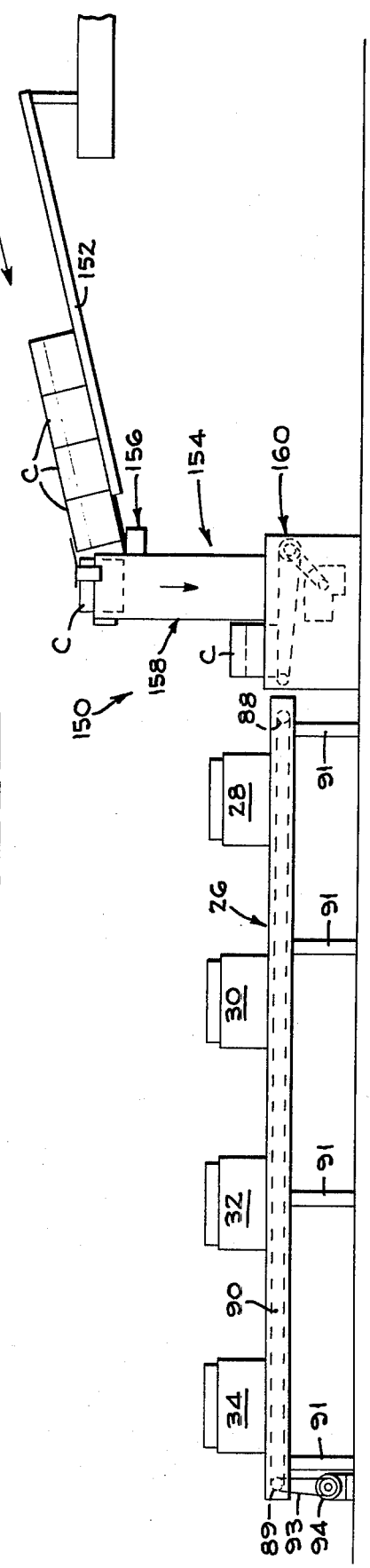
FIG_11
FIG_12

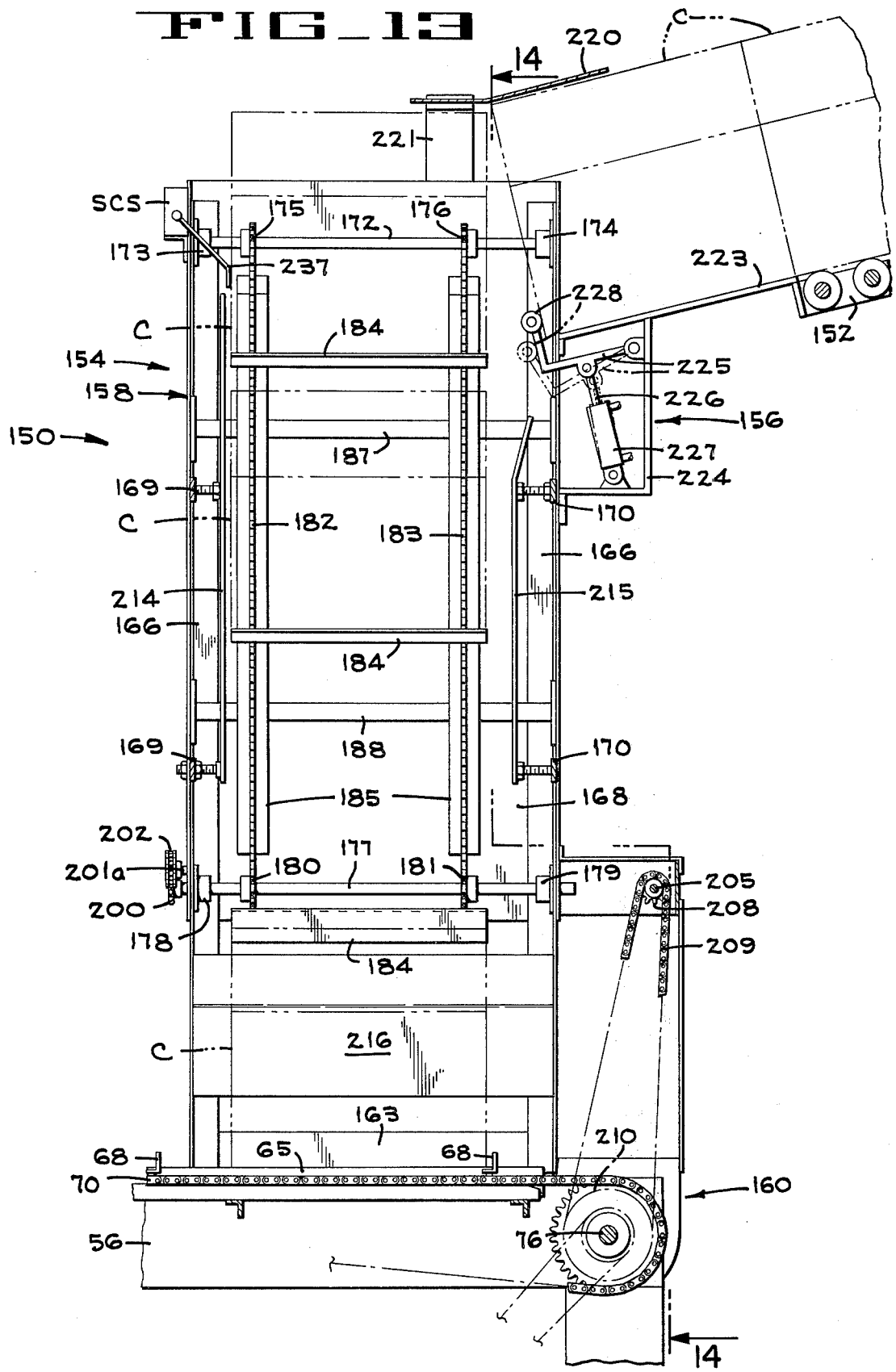

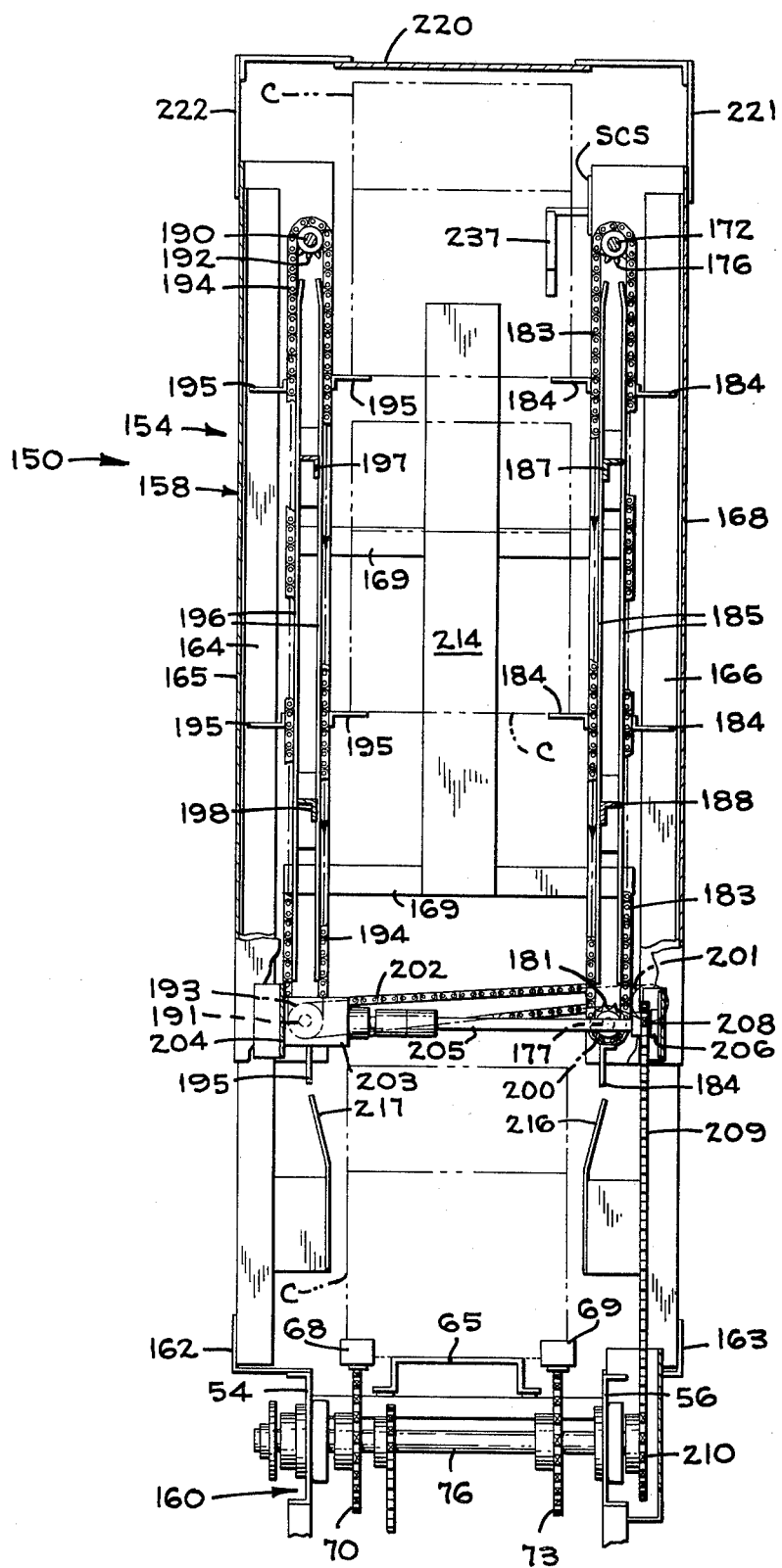
FIG_14

CARTON FEEDING SYSTEM

BACKGROUND OF THE INVENTION

1. Field of the Invention

This invention relates to a carton feeding system, and more particularly, it pertains to a system for automatically feeding empty cartons to a plurality of packing machines that fill the cartons with a product.

2. Description of the Prior Art

In a fruit packing house, packing machines feed fruit, such as oranges or lemons, directly into cartons. Such cartons are obtained in a collapsed condition and must be folded open to form an open-topped rectangular box for receiving the fruit. This may be done by hand, but in many instances a carton set-up machine is used to open the cartons. Such empty cartons must then be fed to the packing machines where they are to be filled.

One carton set-up machine can normally supply cartons at a rate sufficient to satisfy the demand of several packing machines. The carton demand for each packing machine varies with the grade and size of fruit being packed and with the character of the fruit being processed in the packing house. It has been the practice to feed the empty cartons on an overhead conveyor, and packers must manually remove the cartons from the overhead conveyor for selectively feeding to each of the packing machines required.

SUMMARY OF THE INVENTION

The purpose of the present invention is to provide a conveying system for selectively and automatically feeding empty cartons to a plurality of packing machines in accordance with the carton demand of each packing machine. Such purpose is achieved by a conveying system which includes an accumulation conveyor for holding and selectively feeding empty cartons which are arranged in single file order, a singulator which receives the cartons from the accumulation conveyor feeds an empty carton in response to the carton demand of a packing machine, a feed conveyor which receives the empty cartons from the singulator and feeds them along a path, a plurality of feed units positioned along the path which selectively stop the cartons and shift them laterally toward those packing machines which require them, and control means responsive to the carton demand of each packing machine which operates to direct the singulator and the feed units to feed a single empty carton toward the proper packing machine.

A modified form of the invention provides for the automatic feeding of cartons from a source of supply on an upper floor level to one or more packing machines located on a lower floor level. In this form of the invention, the singulator operates so as to lower cartons from the accumulation conveyor on the upper floor level to the lower floor level where it delivers the cartons to the feed conveyor that directs them toward the feed units and their respective packing machines.

BRIEF DESCRIPTION OF THE Drawing

FIG. 1 is a diagrammatic broken plan of a carton feeding system embodying the present invention.

FIG. 2 is a diagrammatic side elevation of the carton feeding system shown in FIG. 1.

FIG. 3 is an enlarged longitudinal section in elevation of the singulator portion of the system shown in FIG. 2.

FIG. 4 is a section taken on the line 4—4 of FIG. 3.

FIG. 5 is a fragmentary side elevation taken in the direction of the arrows 5—5 of FIG. 4.

FIG. 6 is an enlarged longitudinal section illustrating one of the feed units of the carton feeding system of FIG. 2.

FIG. 7 is a reduced section taken on the line 7—7 of FIG. 6.

FIG. 8 is an enlarged section taken on the line 8—8 of FIG. 7.

FIG. 9 is a schematic illustration of the pneumatic circuitry of the system of the present invention.

FIG. 11 is a diagrammatic broken plan of a modified form of the carton feeding system of the present invention.

FIG. 12 is a diagrammatic side elevation of the carton feeding system shown in FIG. 11.

FIG. 13 is an enlarged longitudinal section in elevation of the lowerator portion of the singulator in the carton conveying system shown in FIG. 12.

FIG. 14 is a section taken on the line 14—14 of FIG. 13.

FIG. 15, on sheet 4 of the drawings, is a schematic illustration of pneumatic circuitry utilized in the modified form of the invention shown in FIG. 11.

FIG. 16, on sheet 4 of the drawings, is a schematic illustration of electrical circuitry utilized in the modified form of the invention shown in FIG. 11.

DESCRIPTION OF THE PREFERRED EMBODIMENTS

Figure 10:
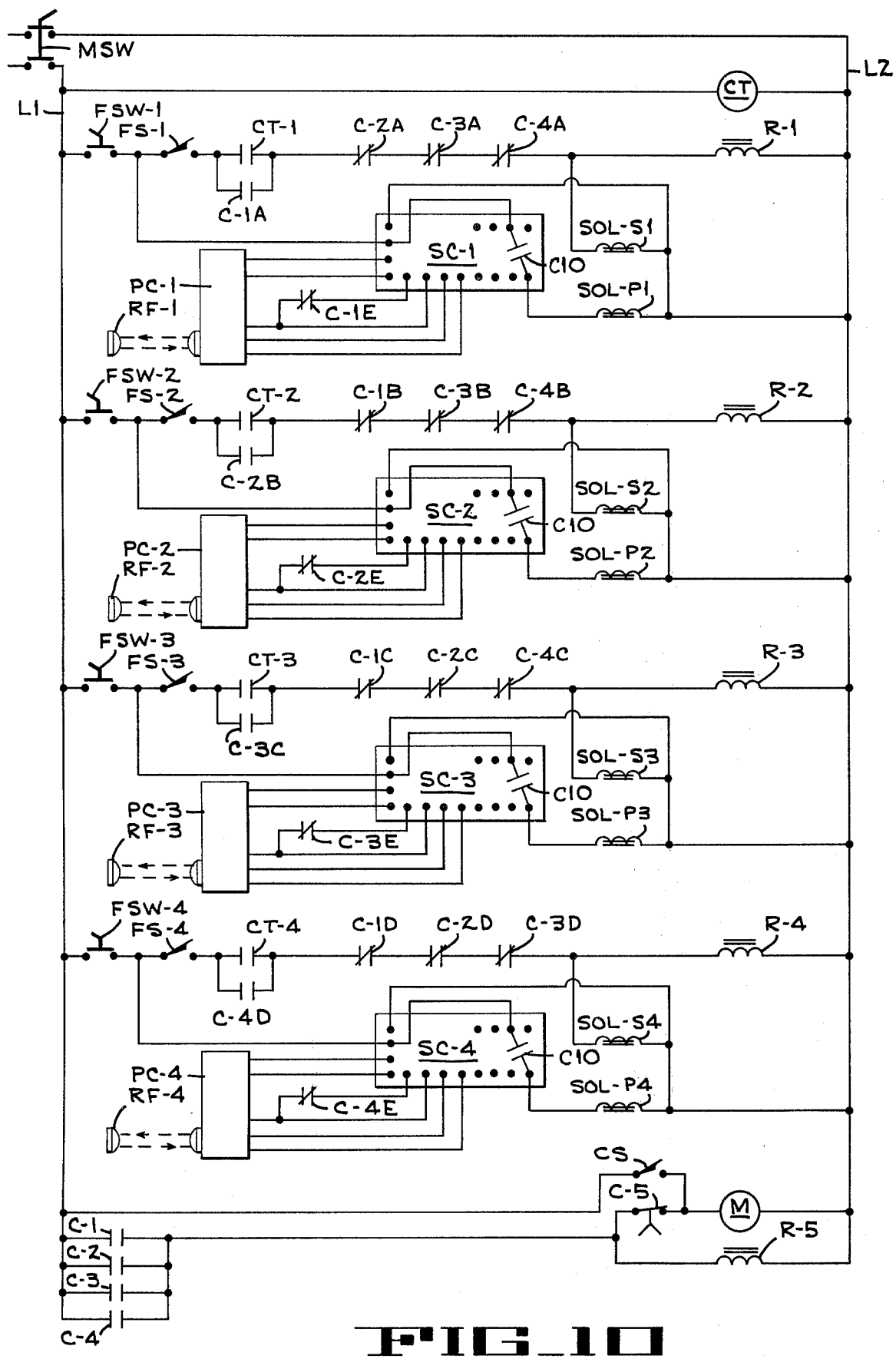
FIG. 10 is a schematic illustration of the electrical circuitry of the system of the present invention.

With reference to FIGS. 1 and 2, a carton feeding system 20 is shown for automatically feeding empty cartons C to packing machines P1, P2, P3 and P4 which fill the cartons with a product such as citrus fruit. The system includes an accumulation conveyor 22 that receives empty cartons from a carton set-up machine, not shown, and moves a series of cartons arranged in single file to a singulator 24. Upon demand signals from the packing machines, which are initiated by feed sensing switches FS-1, FS-2, FS-3 and FS-4 (FIG. 1), the singulator is operated to feed empty cartons, one at a time, to a feed conveyor 26 that conveys the cartons along the path defined thereby in the direction of arrow 27 (FIG. 1) and past a plurality of feed units 28, 30, 32 and 34. When a carton reaches the feed unit opposite the packing machine that needs a carton, the feed unit is operated to stop the carton and shift it laterally therefrom towards such packing machine.

The accumulation conveyor 22, as shown in FIG. 3, includes an endless belt 36 trained about a roller 38 and another roller, not shown, that are each rotatably mounted within a frame 40 that is supported upon legs 42. The endless belt is arranged to be continuously driven through a suitable drive (not shown) to convey cartons C in the direction of arrow 44 toward the singulator 24. Cartons C will accumulate upon the upper run of the endless belt until they are removed by the singulator.

The singulator 24, shown in FIGS. 3, 4 and 5, includes a support frame with a generally rectangular base formed by a pair of spaced longitudinal members 46 (one only shown in FIG. 3) and a pair of spaced transverse members 48 and 49. Projecting in upright positions from the corners of the rectangular base are four posts 52 (one not shown) which serve to support in spaced parallel relationship a longitudinally extending left side plate 54 and a right side plate 56 (FIG. 4). These side plates are held in spaced relationship by transverse braces 57, 58, 59, 60 and 61 (FIG. 3). An end plate 62 is supported by the upstream transverse brace 61 and is arranged to extend transversely across the side plates and rearwardly to a position directly adjacent to the discharge end of the accumulation conveyor belt 36. A left carton guide 63 (FIG. 4) is mounted upon left side plate 54 at a location forward of the end plate 62. The carton guide comprises a flat plate which projects upwardly and inwardly of the singulator and extends rearwardly over the end plate. A right carton guide 64 is mounted on right side plate 56 in a similar manner.

Extending longitudinally along the center portion of the singulator 24 is a flat-surfaced skid 65 that is supported upon the transverse braces 58, 59 and 60. Cartons C, advanced by the accumulation conveyor 22, slide over the end plate 62 and drop down upon the upper flat surface of the skid. The cartons are advanced longitudinally upon the skid by a pair of pushers 68 and 69 which contact the rear bottom corners of a carton on opposite sides of the skid, as shown in FIG. 4. These pushers can also serve as stops to hold back the cartons C on the accumulation conveyor, as shown in FIG. 3.

The pushers 68 are mounted at uniformly spaced intervals along an endless conveyor chain 70 that is trained about an idler sprocket 71 at its downstream end and a drive sprocket 72 at its upstream end. The pushers 69, shown in FIG. 4, are mounted at the same uniformly spaced intervals along an endless conveyor chain 73 that is trained about an idler sprocket (not shown) at its forward or downstream end and a drive sprocket 74 at its rearward end. The upper run of endless conveyor chain 70 is supported longitudinally by a track 67 mounted upon transverse braces 58, 59 and 60, and a similar track, not shown, supports the upper run of endless conveyor chain 73.

The downstream idler sprockets for the endless conveyor chains 70 and 73 are mounted upon an idler shaft 75 that extends transversely between side plates 54 and 56. These side plates are provided with suitable bearings (not shown) which journal the ends of the shaft for rotation. Both drive sprockets 72 and 74 are mounted upon a drive shaft 76 that is journalled for rotation in a bearing unit 77, mounted on left side plate 54, and a bearing unit 78, mounted on right side plate 56. The drive shaft is driven by a sprocket 79 mounted thereon. An endless drive chain 80 is trained about the sprocket 79 and about a drive sprocket 81 that extends from the drive shaft of an electric motor M.

A cam 84 (FIG. 5) is mounted upon the end of the drive shaft 76 that projects outwardly from the left side plate 54. A cam follower 85 contacts the periphery of the cam and its pivotal movement controls a cam switch CS mounted to the left side plate. The cam switch operates to stop the motor M after the drive shaft 76 makes one complete revolution which results in the advancement of the pushers 68 and 69 through a distance equal to the spacing between the pushers along the conveyor chains. Thus, the singulator 24 discharges only one carton during any single operation thereof.

The feed conveyor 26, which is positioned to receive the cartons C that are discharged from the singulator 24, includes a conventional endless belt 87 trained about rollers 88 and 89, as shown in FIG. 2. The rollers are mounted for rotation in a longitudinal frame 90 that is supported upon legs 91 so that the upper run of belt 87 extends in the same horizontal plane as does the flat support surface of the skid 65. A track 92 (FIG. 3) extends longitudinally within the frame for supporting the upper run of the endless belt 87. The roller 89 is driven through a suitable drive connection 93 with a motor 94 (FIG. 2) that operates continuously during the carton feeding operation.

Feed units 28, 30, 32 and 34 are mounted upon the feed conveyor frame 90 above the endless belt 87 and are positioned opposite the packing machines P4, P3, P2 and P1, respectively, as shown in FIG. 1. Since these feed units are of similar construction, only feed unit 28 will be described in detail it being understood that feed units 30, 32 and 34 are similar.

Looking now at FIGS. 6, 7 and 8, the feed unit 28 will be seen to comprise a housing formed by a left side panel 97, a right side panel 98, and a top panel 99. Each end of the housing is reinforced by a frame (FIG. 8) that includes a pair of upright angles 100 and a top transverse angle 101. The side panels 97 and 98 have inwardly turned bottom flanges 102 and 103 (FIG. 8), respectively, that extend beneath the upright angles 100 to form a base for the feed unit which is arranged to rest upon the tops of the side rails of the feed conveyor frame 90. A plurality of longitudinally spaced straps 95 project inwardly from bottom flange 102 and support a cylindrically shaped carton guide 96 that extends longitudinally above the left edge of the endless belt 87. A rectangular opening 104 (FIG. 6) is provided in the right side panel 98 for permitting the discharge of a carton C from the conveyor belt 87 to the packing machine P4. An elongated slot 105 (FIG. 8) is provided in the top panel to allow upward pivotal movement of a stop arm 106. The stop arm projects upwardly through the slot when in its elevated position (as shown in phantom line in FIG. 6). A connecting ear 107 that projects upward from the stop arm connects the stop arm to an actuating device which will later be described.

The mechanism for stopping cartons C moving along the feed conveyor 26 at the feed unit 28 includes the stop arm 106, and this stop arm is fixed to a pivot shaft 111, as shown in FIG. 6. The opposite ends of the pivot shaft are journalled in bearing blocks 112 and 113 mounted to the housing side panels 97 and 98, respectively. The stop arm is bent in a dogleg manner to extend over and down the leading side of a carton (FIG. 6) and has a tee-shaped cross section with a transverse bar 114 mounted at the lowermost end thereof. The connecting ear 107 projects upwardly from the stop arm through the slot 105 with the distal end thereof being coupled by a clevis to a piston rod 115 that projects from a pneumatic cylinder 116. A trunion pivot mount 117 is fixed to the top panel 99 for holding the pneumatic cylinder in place. To selectively stop cartons moving along the feed conveyor 26, the piston rod of the pneumatic cylinder is extended to position the stop arm as shown in solid line in FIG. 6. Cartons can pass through the feed unit 28 when the piston rod is retracted to move the stop arm upwardly as shown in phantom line in FIG. 6.

The mechanism for pushing cartons C laterally from the feed unit 28 includes a pivotally mounted pusher arm 120 that extends through a small opening (not shown) in top panel 99. The upper end of the pusher arm 120 is pivotally connected to a mounting bracket 121 that is fixed to the upper side of the top panel. The pusher arm is bent slightly so that the lower portion of the arm, which extends downwardly along the side of a carton, can be positioned directly adjacent to and parallel to the left side panel 97 of the feed unit housing. A pusher bar 122 is mounted so as to extend transversely of the lower end of the pusher arm. The pusher arm is coupled by a clevis to a piston rod 123 that projects from a pneumatic cylinder 124 which serves to move the pusher arm between the solid line and phantom line positions indicated in FIG. 8. A trunnion pivot mount 125, fixed to the under side of the top panel 99, mounts the pneumatic cylinder 124 in an operative position.

A scanner PC-4, comprising a combination light source and photodetecting means, is mounted to the left side panel 97 and is angled to project a beam of light (as shown in FIG. 7) transversely and slightly downstream of the feed conveyor 26 to a position where a reflector RF-4 is mounted upon the right side panel 98. When a carton C is retained by the stop arm 106 of a feed unit, the light beam between the scanner and reflector is obstructed by a corner of the carton. Such a breaking of the light beam causes actuation of the pneumatic cylinder 124 for pivoting the pusher arm 120 inwardly and shifting the carton laterally to a packing machine, as will later be described in greater detail.

An opening 129 is provided in the right side rail of the feed conveyor frame 90 adjacent to the opening 104 in the side panel 98 and directly opposite the pusher arm 120, and a plurality of spaced rollers 130 are mounted adjacent the lower edge of the opening to enable cartons C to roll from the upper run of the belt 87 onto an infeed conveyor portion of the packing machine when such cartons are shifted off of the conveyor belt by the pusher arm. A guide plate 131 (FIG. 7), mounted to the packing machine infeed conveyor, guides the cartons as they pass over the rollers and onto the infeed conveyor. A feed switch FS-4 is mounted on the frame of the infeed conveyor for packing machine P4 and includes an actuating arm 132 that is positioned so as to contact cartons moving along the infeed conveyor. Similar feed switches FS-1, FS-2 and FS-3 are provided for packing machines P1, P2 and P3, respectively. When the feed switch actuating arm does not contact a carton on the associated infeed conveyor, an electrical circuit is activated to send a carton; when the arm contacts a carton, the electrical circuit is deactivated—such circuitry being described in greater detail hereinafter.

The pneumatic circuitry for the carton feed system of the present invention is shown in FIG. 9, and it will be appreciated that each feed unit includes a similar pneumatic circuit so that only the circuitry of feed unit 34 has been shown in detail. The piston rod 115 that actuates the stop arm 106 is controlled by a first portion of the pneumatic circuit. A line 135 supplies pressurized air to a line 136 that is coupled with a valve 137 having four connections, two positions, a spring offset and a control solenoid SOL-S1. In the normal valve position shown in FIG. 9, air flows through the valve and into a line 138 that is coupled to one end of the pneumatic cylinder 116, and air is exhausted from within the pneumatic cylinder through a line 140, the valve and an exhaust line 141. In this normal valve position, the piston rod 115 is retracted and the stop arm 106 will be in its elevated position. When the solenoid SOL-S1 is energized and the valve has been shifted to its alternate position, pressurized air is fed through the line 140 to extend the piston rod while air ahead of the piston is exhausted through the line 138, the valve 137 and the line 141. This causes the lowering of the stop arm 106 into position to intercept a carton moving along the feed conveyor 26—as shown in full line in FIG. 6.

The piston rod 123 that actuates the pusher arm 120 is controlled by a second portion of the pneumatic circuit including a line 143 that supplies pressurized air from the line 135 to a valve 144, such valve being similar to valve 137 and having four connections, two positions, a spring offset and a control solenoid SOL-P1. In the normal valve position shown, pressurized air flows through the valve and a line 145 to the pneumatic cylinder 124 to extend the piston rod 123 while air is exhausted from within the pneumatic cylinder ahead of the piston through a line 147, the valve and an exhaust line 148. In this normal valve position the pusher arm 120 will be retracted out of the path of the cartons on the feed conveyor 26—as shown in full line in FIG. 8. When the solenoid SOL-P1 is energized and the valve has been shifted to its alternate position, pressurized air is fed through the line 147 to retract the piston rod 123 while air behind the piston is exhausted through the line 145, the valve and the line 148. This causes the movement of the pusher arm 120 across the conveyor belt 87 to the position shown in phantom line in FIG. 8 and the consequent discharge of a carton from the conveyor belt.

The electrical circuitry, shown in detail in FIG. 10, will now be described in conjunction with the operation of the carton feeding system 20. To understand the symbols used in the schematic diagram of FIG. 10, it should be noted that the numbers following the contact designation "C-" relate those contacts to the similarly numbered relays designated by the letter "R-" whose energization determines the actuated position of the related contacts--the contacts being shown in their normal, or un-energized, condition in FIG. 10. Further, the numbers at the end of the solenoid designations which begin with the prefix "SOL-" indicate the packing machine and feed unit with which such solenoids are associated.

To prepare the system for operation, the operator closes a main switch MSW to provide a potential between main power lines L-1 and L-2, and the operator also closes as many of the feed unit switches FSW-1, FSW-2, FSW-3 and FSW-4 as he desires to put the packing machines P1, P2, P3 and P4, respectively, into operation. If it is desired to have all packing machines operating, all feed unit switches will be closed.

When the main switch MSW is closed, a motor driven, rotary cam timer CT is energized to sequentially close normally open contacts CT-1, CT-2, CT-3 and CT-4 for brief time intervals. If, for example, no carton C is in a position to contact the actuating arm 132 of the feed switch FS-4, this switch will be closed when the timer closes contacts CT-4 and a relay R-4 will then be energized. Contacts C-4 are closed by the relay R-4, and the electric motor M of the singulator 24 is then energized through the closed contacts C-4 to advance the conveyor chains 70 and 73 for releasing a carton to the feed conveyor 26. A time delay relay R-5 is energized through the closed contacts C-4, and after a time delay period will open the contacts C-5, such time delay being long enough to allow the cam 84, which is driven by the singulator drive shaft 76, to close the cam switch CS. As the cam 84, shown in FIG. 5, begins to make its single revolution, the cam switch CS closes to maintain energization of the motor M until the cam completes one full revolution. This will occur after the time delay period of the relay R-5 has expired and the contacts C-5 have opened. Thus, the singulator 24 operates for a predetermined amount of time (as set by the movement of the cam 84) and feeds only a single carton before stopping.

Energization of the relay R-4 also opens contacts C-4A, C-4B and C-4C to de-activate the electrical circuitry for feed units 30, 32 and 34; thus, until the completion of the feeding of a carton to the packing machine P4, none of the other packing machines can receive any cartons. The relay R-4 also closes holding contacts C-4D, to maintain energization of the relay R-4 after the timer CT reopens the contacts CT-4 and until the completion of the carton delivery operation and the opening of feed switch FS-4. The energization of relay R-4 also opens contacts C-4E, to ready the scanner PC-4 and the scanner controls SC-4 for operation. The scanner comprises a conventional combination light beam source and photodetector means, and its associated controls are also conventional circuits which include a transformer, a rectifier, an amplifier, a relay and a series of contacts. Only the external wiring diagram for SC-4 has been shown since the details of the circuitry are entirely conventional and will be readily understood by those skilled in the art. Such details are not in any way critical to an understanding of the present invention. As pointed out, when the contacts C-4E are opened by energization of relay R-4, current must pass through the controls and the control circuitry SC-4 will be activated.

It should also be noted that control solenoid SOL-S4 is energized when relay R-4 is energized, and energization of this solenoid shifts the proper valve 137 to a position whereby the associated piston rod 115 is extended from its pneumatic cylinder 116 to cause the associated stop arm 106 to be lowered to block a carton C being advanced by the feed conveyor 26. When the carton has been moved into position behind the stop arm, the light beam between the scanner PC-4 and the reflector RF-4 will be broken. A relay (not shown) within the scanner controls SC-4 is actuated in response to the breaking of the light beam, and this relay will close a set of contacts C-10 in SC-4 to energize solenoid SOL-P4. Such energization of solenoid SOL-P4 shifts the proper valve 144 to a position whereby the associated piston rod 123 is retracted within its pneumatic cylinder 124 and the associated pusher arm 120 shifts the stopped carton laterally onto the infeed conveyor of packing machine P4. Upon discharge of the carton, the light beam is restored and the contacts C-10 open to de-energize the solenoid SOL-P4. When the newly delivered carton contacts the actuating arm 132 of feed switch FS-4, the feed switch opens, de-energizing relay R-4 and restoring the circuit to its original condition.

As the timer CT subsequently closes contacts CT-1, CT-2 and CT-3, the same procedure as set forth above for CT-4 is repeated for each of the packing machines P1, P2 and P3 if there is a need for a carton and if the circuitry for the particular feed unit has not been previously de-activated by a demand to feed a carton C to another packing machine. It will be recognized that an activation of any of relays R-1, R-2 or R-3 will result in the same operation as that described with respect to the activation of relay R-4.

A modified carton feeding system 150 is shown in FIGS. 11–16. Elements of this system that are similar to those elements previously described with respect to the carton feeding system 20 will be given the same reference numeral. Such similar components include the feed conveyor 26, feed units 28, 30, 32 and 34, and packing machines P1, P2, P3 and P4. All of such structure is located on a lower level, as shown in FIG. 12.

In the modified carton feeding system 150, an accumulation conveyor 152, that is located upon an upper level, receives empty cartons C from a carton set-up machine, not shown, and moves a series of the cartons in single file to a singulator 154 that includes a carton separator 156, a lowerator 158 and a horizontal conveyor 160 (FIG. 12). The carton separator, located at the discharge end of the accumulation conveyor, limits the movement of the cartons into the lowerator to prevent interference between cartons during operation of the lowerator. Cartons are lowered vertically by the lowerator to the horizontal conveyor 160 which feeds the cartons to the feed conveyor 26. Thus, the singulator 154 extends between the upper level of the accumulation conveyor and the lower level of the feed conveyor for feeding single empty cartons to the latter upon demand by any of the packing machines P1, P2, P3 and P4.

The horizontal conveyor 160 is similar to the conveyor of the previously described singulator 24, shown in FIGS. 3–5, with the exceptions that the end plate 62 and the carton guides 63 and 64 have been removed and the drive shaft 76 has been extended on the right hand side of the right side plate 56 (FIG. 14) to receive an additional sprocket for a purpose to be subsequently described.

The lowerator 158, shown in detail in FIGS. 13 and 14, is mounted upon the horizontal conveyor 160 by means of a pair of base angles 162 and 163 (FIG. 14) that are fastened to the upper flanges of the left side plate 54 and the right side plate 56, respectively. A pair of spaced legs 164 (one only being shown in FIG. 14) extend in upright positions from the base angle 162 and mount a side panel 165 which is provided with inwardly turned flanges secured about the legs. Similarly, a pair of legs 166 extend in upright positions from the base angle 163 and serve to mount a side panel 168 that includes inwardly turned flanges secured about the supporting legs. The side panels 165 and 168 are connected to each other at the forward end of the lowerator by a pair of transverse braces 169 (FIG. 13) and are connected at the rearward end of the lowerator by a pair of transverse braces 170, each of such braces being bolted to the inwardly turned flanges of the side panels.

An upper shaft 172 at the top of the lowerator is journalled at one end in a bearing 173 (FIG. 13) that is attached to the forward inwardly turned flange of the side panel 168, and the opposite end of the shaft 172 is journalled in a bearing 174 that is attached to the rear flange of the side panel 168. A forward sprocket 175 and a rear sprocket 176 are mounted upon upper shaft 172 to rotate therewith. Near the bottom of side panel 168, a lower shaft 177 is journalled between a forward bearing 178 and a rear bearing 179 that are attached to the opposite inwardly turned flanges of the adjacent side panel 168. A forward sprocket 180 and a rear sprocket 181 are mounted upon the shaft 177 to rotate therewith and are fixed in positions located directly under the corresponding sprockets 175 and 176 on the upper shaft 172. Trained about the sprockets 175 and 180 is an endless chain 182, and a similar endless chain 183 is trained about the sprockets 176 and 181. A series of angle iron support lugs 184 extend transversely between and are secured to the endless chains 182 and 183. These support lugs are mounted at equal spacings along the length of the chains. The inwardly facing sides of the chains 182 and 183 in the vertical runs thereof are braced against inward movement by a pair of opposed chain guides 185 that are mounted upon a pair of support angles 187 and 188 extending between the end flanges of the side panel 168.

Between the flanges of side panel 165, an upper shaft 190 and a lower shaft 191 are rotatably mounted in bearings, not shown, at positions spaced opposite the shafts 172 and 181, respectively. A pair of sprockets 192 are mounted on the upper shaft and a pair of sprockets 193 are mounted on the lower shaft (one set of sprockets only being shown in FIG. 14). Trained about these sets of sprockets 192 and 193 are a pair of endless chains 194 having a series of angle iron support lugs 195 mounted thereto so as to extend between the chains at equal spaces along the length of the chains. The chains 194 are supported along the vertical runs between the sprockets by a pair of opposed chain guides 196 that are similar to the chain guides 185 and that are supported by an upper support angle 197 and a lower support angle 198, both of which extend between the inwardly turned flanges of the side panel 165. The two endless chains 194 are aligned with the endless chains 182 and 183, as shown in FIG. 14, so that the support lugs 195 and 184 are positioned in opposed relationship at the same level in the inwardly facing runs of the chains for supporting cartons C thereon as they move downwardly within the lowerator 158.

To drive the endless chains 182, 183 and 194, a drive sprocket, not shown, is mounted on the forwardly projecting end of the lower shaft 191 for rotation therewith and a driven sprocket 200 (FIG. 13) is mounted on the forwardly projecting end of lower shaft 177. An idler sprocket 201 is mounted for rotation on a stub shaft 201a (FIG. 13) that projects forwardly from the forward inturned flange of side panel 168. A drive chain 202 is trained about the drive sprocket on shaft 191 and the idler sprocket 201 (FIG. 14) with the lower run of the drive chain 202 being in driving engagement with the top of the driven sprocket 200. Thus, the lower shaft 177 is driven to rotate in the opposite direction but at the same speed as the lower shaft 191.

The rearward end of the lower shaft 191 has a flexible coupling therein and extends into a gear box 203 (FIG. 14). The gear box is mounted on a bracket 204 that is attached to the inwardly turned flange of the adjacent side panel 165. The gear box provides a right angle drive connection for shaft 191 and includes a drive shaft 205 that extends transversely of the lowerator, as shown in FIG. 14. The projecting end of the drive shaft 205 is journalled for rotation within a bearing 206 that is mounted to side panel 168. A sprocket 208 is keyed to the drive shaft 205 near the bearing 206. A drive chain 209 is trained about the sprocket 208 and a sprocket 210 that is mounted upon the end of the horizontal conveyor drive shaft 76 projecting outwardly from the right side plate 56 (FIG. 14). Thus, the vertically extending endless chains 182, 183 and 194 are all driven simultaneously with the endless roller chains 70 and 73 of the horizontal conveyor 160. The vertical chains are positioned relative to the horizontal chains so that the opposed support lugs 184 and 195 release both sides of a carton C at the same time to drop the carton onto the skid 65 between two longitudinally spaced pairs of pushers 68 and 69, as indicated in FIG. 13. Thus, the feeding of a carton through one indexing movement proceeds smoothly from the lowerator 158 to the horizontal conveyor 160 in the singulator 154.

The lowerator 158 also includes a vertically extending carton guide and stop plate 214 which is mounted by bolts to the transverse braces 169 (FIG. 13) in a position spaced inwardly therefrom. The stop plate 214 serves to stop cartons C as they slide into place on the support lugs 184 and 195 at the top of the lowerator and it also serves to guide the forward ends of the cartons as they are lowered. Another vertically extending carton guide 215 (FIG. 13) is mounted by bolts to the transverse braces 170 in opposed relationship to the carton guide 214 for supporting the rear ends of the cartons as they are lowered. An upright carton guide 216 plate extends inwardly from the legs 166 at the lower end of the lowerator to guide one side of the cartons as they drop from the support lugs 184 and 195 to the skid 65 of the horizontal conveyor 160, and an opposed carton guide 217 extends inwardly from the legs 164 for guiding the opposite side of the cartons at the lower end of the lowerator.

An angled depression plate 220 (FIG. 13) is mounted above the lowerator 158 by a strap angle 221 connected to the side panel 168 and by a strap angle 222 (FIG. 14) connected to the side panel 165. A skid plate 223 is mounted between the end of the accumulation conveyor 152 and the entrance to the lowerator to permit the cartons C to slide therebetween. The depression plate prevents the cartons from tilting upwardly from the skid plate as they move into the lowerator. The carton separator 156 (FIG. 13) is mounted upon a bracket 224 attached to the lowerator beneath the skid plate. The carton separator includes an arm 225 that is pivotally connected to the bracket 224 at one end thereof. The mid-portion of the separator arm is connected to an actuating rod 226 of a pneumatic cylinder 227 that is also pivotally supported by the bracket 224. The separator arm has an upright distal end portion that supports a stop roller 228 in a position near the lower end of the skid plate. When the actuating arm of the pneumatic cylinder 227 forces the separator arm to its upper position, as shown in FIG. 13 in solid line, the stop roller blocks a carton from sliding from the skid plate to the lowerator. When the separator arm and its stop roller are lowered by the pneumatic cylinder 227, to the position shown in phantom line in FIG. 13, a carton can slide or roll over the stop roller and into the lowerator.

With reference to FIG. 15, located on sheet 4 of the drawings, the pneumatic circuitry for operating the carton separator pneumatic cylinder 227 is supplied with pressurized air through the line 135. A line 230 is coupled with a valve 231 having four connections, two positions, a spring offset and a control solenoid SOL-SS. In the normal valve position (shown in FIG. 15) air flows through the valve and a line 232 to extend the actuating arm 226. Air is exhausted from within the pneumatic cylinder through a line 234, the valve and an exhaust line 235. When the solenoid is energized the valve 231 is shifted and pressurized air is fed through the line 234 to retract the actuating arm while air is exhausted from the pneumatic cylinder through the line 232, the valve 231 and the line 235.

The lowerator also includes a carton separator switch SCS which is mounted at the top of the lowerator, as shown in FIGS. 13 and 14, and includes a downwardly extending actuating arm 237 that is positioned so as to be contacted by a carton C as it slides into the lowerator and before it reaches the carton guide and stop plate 214. The switch SCS is in a normally closed position and is opened by contact by a carton with the actuating arm. With reference to FIG. 16, the switch SCS is connected in series between main power lines L-1 and L-2 with a solenoid SOL-SS and a normally closed set of contacts C-6. These contacts are controlled by a relay R-6 that is connected in series with the main drive motor M. Thus, the solenoid SOL-SS will be energized to permit a carton to be delivered to the lowerator only when the electric motor M that operates the conveyors in the singulator 154 has stopped and no carton is in contact with the actuating arm 237 of switch SCS at the upper portion of the lowerator.

All other electrical circuitry and pneumatic circuitry for the carton feeding system 150 is the same as previously described for the carton feeding system 20. The accumulation conveyor 152 can be in the form of a slide, a ramp, a roller conveyor or a belt conveyor whereupon cartons C are fed to the skid plate 223. Otherwise, the operation of the two described carton feeding systems is similar.

Thus, both carton feeding systems 20 and 150 automatically feed empty cartons C to a plurality of packing machines P1, P2, P3 or P4 as required in accordance with the carton demand of each packing machine. The carton feeding system 150 automatically feeds cartons from a source of supply on an upper floor level to one or more packing machines located on a lower floor level. Floor space on the lower level can be conserved by placing the accumulation conveyor on an upper level, and a further saving of floor space is achieved by the singulator 154 which lowers cartons vertically.

Although the best modes contemplated for carrying out the present invention have been herein shown and described, it will be apparent that modification and variation may be made without departing from what is regarded to be the subject matter of the invention.

What is claimed is:

1. A system for automatically feeding empty cartons to a plurality of packing machines that fill the cartons with a product, said system comprising:

an accumulation conveyor disposed at one level for moving a series of empty cartons arranged in single file, a singulator disposed at a lower level for receiving empty cartons from said accumulation conveyor, said singulator having a movable conveyor for advancing a plurality of empty cartons received from said accumulation conveyor, means for receiving a demand signal from one of said packing machines and means for causing said conveyor to advance said plurality of empty cartons a predetermined distance, corresponding to the space occupied by one of said cartons on said conveyor, in response to each of said demand signals to thereby feed a single carton from said singulator in response to each of said demand signals, and simultaneously to allow a replacement carton to be received onto said singulator from said accumulation conveyor, a feed conveyor for receiving empty cartons from the singulator and feeding the empty cartons along a path, a plurality of feed units located at spaced positions along the feed conveyor, each feed unit including means for selectively stopping empty cartons moving along the path in response to said demand signals and shifting the empty cartons laterally therefrom toward a packing machine, and control means responsive to the carton demand of each packing machine for providing said demand signals, said control means being connected to said singulator and said feed units for directing the singulator and the feed units to feed a single empty carton towards any packing machine that needs a carton, said control means further including means for preventing the operation of said singulator until after a carton released therefrom has been shifted by one of said feed units from said path.

2. The system described in claim 1 wherein said accumulation conveyor is located at an upper level and said feed conveyor and feed units are located at a lower level, said singulator extends substantially vertically between the upper level and the lower level for receiving empty cartons from the accumulation conveyor and feeding the empty cartons to the lower level, and said plurality of empty cartons in said singulator are supported in a substantially vertical stack.

3. The system described in claim 1 wherein said control means includes a plurality of switches with each switch being positioned between one of the packing machines and one of the feed units for sensing the absence of a carton in such position and for generating said demand signal, said demand signal activating the control means to direct a carton thereto.

4. The system described in claim 1 wherein said singulator includes, a plurality of pushers mounted at spaced intervals on said conveyor chain to permit a single carton to be positioned between adjacent pushers, and means for incrementally moving said conveyor chain through a distance corresponding to the spacing between said pushers to feed a single carton to said feed conveyor in response to said demand signal.

5. The system described in claim 3 wherein said control means includes a timer connected so as to successively enable each carton sensing switch for a brief time interval.

6. The system described in claim 3 wherein said control means includes a relay associated with each of said switches and disabling contacts controlled by each relay which disabling contacts are connected in series with each of the other relays.

7. The system described in claim 1 wherein each of said feed units includes a movable stop for blocking the passage of cartons moving therethrough along the feed conveyor, said control means including means for moving each of the stops between a carton blocking position and a position permitting a carton to pass along said path.

8. The system described in claim 7 wherein said control means further includes means for sensing the presence of a carton in a blocked position behind one of said stops, and means operatively associated with said last named means for shifting a blocked carton laterally out of said path.

9. The system described in claim 8 wherein said carton shifting means comprises a push arm associated with each feed unit, and means mounting each of said pusher arms for pivotal movement about an axis spaced above said path of the cartons on the feed conveyor.

* * * * *